Sept. 25, 1928.                                                          1,685,266
G. BAUM
PROCESS FOR HEATING LIQUIDS BY ELECTRICAL ENERGY FOR
DISTILLATION, CONCENTRATION, PROVOCATION
OF CHEMICAL REACTIONS, ETC
Filed Oct. 15, 1925
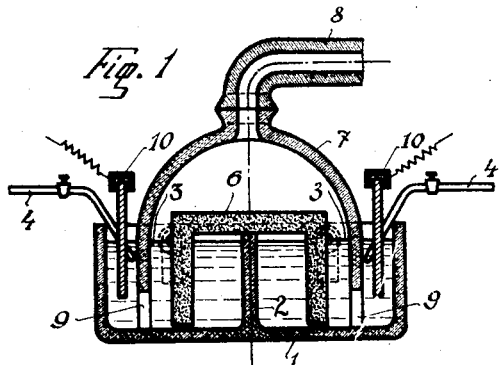
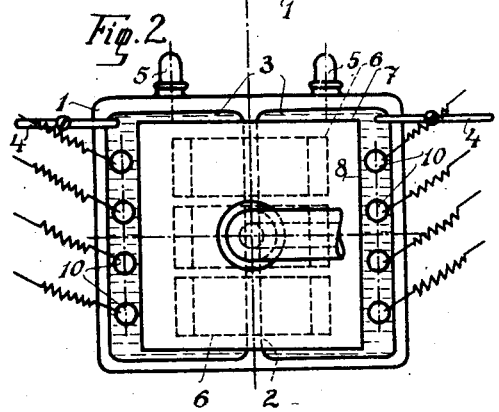
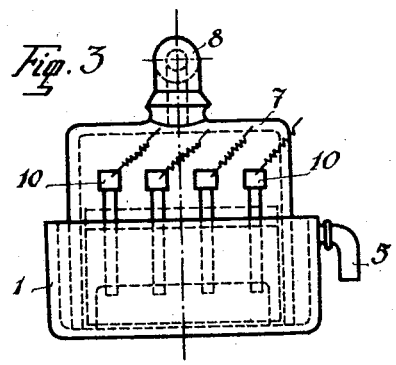

Patented Sept. 25, 1928.

1,685,266

UNITED STATES PATENT OFFICE.

GUSTAV BAUM, OF KARNTEN, AUSTRIA, ASSIGNOR TO THE NIAGARA ELECTRO CHEMICAL COMPANY, INC., OF NEW YORK, N. Y., A CORPORATION OF NEW YORK.

PROCESS FOR HEATING LIQUIDS BY ELECTRICAL ENERGY FOR DISTILLATION, CONCENTRATION, PROVOCATION OF CHEMICAL REACTIONS, ETC.

Application filed October 15, 1925, Serial No. 62,603, and in Austria October 28, 1924.

The present invention relates to a process for heating liquids by electrical energy, which heating may be effected for any purpose and particularly for distillation, concentration or provocation of chemical reactions etc.

In heating liquids by means of electrical energy and utilizing the liquid itself as resistance it is known to place between the electrodes insulating structures, which divide the liquid into streams thus increasing its resistance.

If the heating is to be carried out for the purpose of distillation or concentration or provocation of chemical reactions, the liquid undergoes in the course of its treatment continuous changes of its state and condition (temperature, chemical composition, degree of concentration etc.), owing to which alterations also its resistance changes. The present invention aims at automatically accommodating the resistance to such alterations occurring in the course of the treatment of the liquid. This is obtained by employing structures of porous, sucking or absorbent material, which are plunged or dipped into the electrolyte and which absorb therefrom the liquid to be treated, and passing an electric current through the liquid thus absorbed.

Preferably for this purpose especially shaped bodies are employed having the form of rectangular frames, but with only three sides, the fourth side being left open. The two shanks or legs of this frame plunge into the electrolyte contained in two separate chambers of the liquid receptacle, whilst the part connecting the two legs of the frame bridges over the cross-partition separating the said two chambers.

If the liquid is conducted by a sucking action through structures of like kind, the graduation of the supply and of the division of the liquid according to the change of its state occurring therein during the treatment will be performed automatically, since the cross-section of the liquid diminishes with the distance from the liquid level.

The process admits of a great variety of applications. Organic and inorganic acids can be distilled and concentrated by its means, lyes can be concentrated and prepared for crystallization, solutions of all kinds can be reduced, mixtures of liquids separated and reactions (saponification for instance) carried out, whereby, in every instance, the highest possible theoretical output not only of material but also of thermic effect is nearly obtained. The process enables one likewise to effect the highest possible energy and heat concentration respectively.

In the accompanying drawing by way of example one type of an apparatus working in accordance with the invention is illustrated, which apparatus may e. g. be employed for obtaining pure sulphuric acid from technical (commercial) sulphuric acid. Fig. 1 shows a longitudinal sectional elevation thereof, Fig. 2 the plan view and Fig. 3 an end-view.

1 is a reservoir made of earthenware or of some similar material. The reservoir is divided by a cross-partition 2 into two chambers 3. Each chamber is provided with a feed pipe 4 and with a discharge pipe 5 by means of which the liquid is kept at the same level in both chambers.

The structure 6 made of porous material is shaped like a three sided open frame, the two sides of which plunge into the electrolyte of the two chambers while the piece connecting the two sides of the frame bridges over the chambers and is above the level of the liquid.

A bell 7 is placed over the inner structure, which encloses the distillation chamber and is provided at the top with a discharge pipe 8 for the gases given out. The opening 9 in the body of the bell serve to render possible the communications between the electrolytes in the distillation chamber and the reservoir. The current is led in through the electrodes 10 which plunge outside the bell in the electrolytes of the two chambers 3.

The porous inner structures 6, which are made in sufficient number (in Figure 2, three of them are shown) raise the electrolytes by suction from the chambers 3 into the piece of the frame bridging over the chambers so that through this piece an electric connection between the two chambers is formed. The quantity of liquid present in the bridging piece decreases in the upward direction and the strength of the current and the heating increase to a corresponding amount in the same direction. At the culminating part of the bridge the heating reaches the distillation temperature and the vaporization therefore occurs at that part.

What I claim is:

1. A process for heating liquids by electrical energy, consisting in absorbing the liquid by means of porous material dipping into the electrolyte to be treated and passing an electric current through the absorbed liquid.

2. A process for electrically heating liquids, which process consists of absorbing the liquid by means of porous material plunged into the liquid to be treated, the latter being divided into two portions electrically insulated from one another and connected only by a bridge of porous material and the liquid absorbed therewith, and passing an electric current through the liquid in the porous bridge.

3. Process comprising absorbing liquid in a porous material and passing an electric current through the liquid thus absorbed.

4. Process comprising absorbing liquid in a porous non-conducting material and passing an electric current through the liquid thus absorbed.

5. Process comprising absorbing liquid in an extended porous structure and passing an electric current through the absorbed liquid.

6. Process comprising absorbing liquid at the extremities of an extended porous structure till a continuous liquid path is formed in said structure and passing an electric current through the absorbed liquid.

In testimony whereof I have affixed my signature.

GUSTAV BAUM.